United States Patent
Lee

(10) Patent No.: US 12,438,125 B2
(45) Date of Patent: Oct. 7, 2025

(54) SEMICONDUCTOR DEVICE WITH MULTI-DIRECTIONAL CHIP GUARDS

(71) Applicant: SK hynix Inc., Icheon-si Gyeonggi-do (KR)

(72) Inventor: Nam Jae Lee, Icheon-si Gyeonggi-do (KR)

(73) Assignee: SK hynix Inc., Icheon-si (KR)

( * ) Notice: Subject to any disclaimer, the term of this patent is extended or adjusted under 35 U.S.C. 154(b) by 454 days.

(21) Appl. No.: 17/188,429

(22) Filed: Mar. 1, 2021

(65) Prior Publication Data
US 2022/0068885 A1 Mar. 3, 2022

(30) Foreign Application Priority Data
Aug. 28, 2020 (KR) .................. 10-2020-0109657

(51) Int. Cl.
*H01L 23/62* (2006.01)
*G11C 5/02* (2006.01)
(Continued)

(52) U.S. Cl.
CPC .......... *H01L 25/0657* (2013.01); *G11C 5/025* (2013.01); *G11C 5/06* (2013.01); *H01L 23/5386* (2013.01); *H10D 88/00* (2025.01)

(58) Field of Classification Search
CPC . H01L 23/564; H01L 23/585; H01L 23/3192; H01L 23/562; H01L 22/34; H01L 21/761; H01L 2224/05624; H01L 23/535; H01L 24/05; H01L 24/06; H01L 2924/00014; H01L 21/76224; H01L 21/763; H01L 21/76802; H01L 21/7682; H01L 21/76898; H01L 21/78;
(Continued)

(56) References Cited

U.S. PATENT DOCUMENTS 5,846,874 A * 12/1998 Hartranft .............. H01L 23/562
257/E23.194
6,028,347 A * 2/2000 Sauber .................. H01L 23/585
257/632
(Continued)

FOREIGN PATENT DOCUMENTS

CN 1519924 A 8/2004
CN 1776899 A 5/2006
(Continued)

*Primary Examiner* — Ajay Ojha
*Assistant Examiner* — Tsz K Chiu
(74) *Attorney, Agent, or Firm* — WILLIAM PARK AND ASSOCIATES LTD.

(57) ABSTRACT

A semiconductor device includes: a substrate with a cell region and a chip guard region, the chip guard region surrounding the cell region; a first chip guard extending over the chip guard region in a first direction; a second chip guard extending over the chip guard region in the first direction, the second chip guard being spaced apart from the first chip guard; and a third chip guard extending over the chip guard region in a second direction, the second direction intersecting the first direction. The first chip guard includes a first end portion, the second chip guard includes a second end portion, and the third chip guard includes a third end portion that is disposed between the first end portion and the second end portion.

16 Claims, 11 Drawing Sheets

(51) Int. Cl.
*G11C 5/06* (2006.01)
*H01L 23/538* (2006.01)
*H01L 25/065* (2023.01)
*H10D 88/00* (2025.01)

(58) Field of Classification Search
CPC . H01L 2224/02166; H01L 2224/05553; H01L 2224/0603; H01L 2224/06131; H01L 2224/06133; H01L 2224/06179; H01L 2224/0913; H01L 2224/29099; H01L 2224/32013; H01L 2224/32014; H01L 2224/32245; H01L 2224/45099; H01L 2224/48091; H01L 2224/48227; H01L 2224/48247; H01L 2224/49431; H01L 2224/73265; H01L 23/26; H01L 23/3142; H01L 23/481; H01L 23/5225; H01L 23/5283; H01L 24/09; H01L 24/73; H01L 2924/00; H01L 2924/00012; H01L 2924/0002; H01L 2924/10161; H01L 2924/15311; H01L 2924/181; H01L 2924/3025; H01L 2924/35121; H01L 21/2652; H01L 21/26586; H01L 21/28141; H01L 21/283; H01L 21/31051; H01L 21/31144; H01L 21/3213; H01L 21/743; H01L 21/76; H01L 21/76229; H01L 21/765; H01L 21/76816; H01L 21/76838; H01L 2224/02313; H01L 2224/02331; H01L 2224/02372; H01L 2224/034; H01L 2224/03622; H01L 2224/0391; H01L 2224/0401; H01L 2224/05008; H01L 2224/05124; H01L 2224/05147; H01L 2224/05149; H01L 2224/05157; H01L 2224/05166; H01L 2224/05181; H01L 2224/05184; H01L 2224/05186; H01L 2224/05548; H01L 2224/0557; H01L 2224/06051; H01L 2224/06102; H01L 2224/09103; H01L 2224/13022; H01L 2224/13024; H01L 2224/13144; H01L 2224/1403; H01L 2224/16227; H01L 2224/2919; H01L 2224/73204; H01L 2224/81193; H01L 23/5222; H01L 23/528; H01L 23/5286; H01L 23/53266; H01L 23/552; H01L 24/14; H01L 2924/01074; H01L 2924/013; H01L 2924/04941; H01L 2924/04953; H01L 2924/0496; H01L 2924/05032; H01L 2924/0665; H01L 2924/3512

See application file for complete search history.

(56) References Cited

U.S. PATENT DOCUMENTS

| | | | |
|---|---|---|---|
| 9,188,635 B2 * | 11/2015 | Pagani | H01L 23/564 |
| 9,368,459 B2 | 6/2016 | Furusawa et al. | |
| 10,388,612 B2 | 8/2019 | Lin et al. | |
| 2002/0045295 A1 * | 4/2002 | Hiraga | H01L 29/0619 |
| | | | 257/E29.013 |
| 2002/0167071 A1 * | 11/2002 | Wang | H01L 23/585 |
| | | | 257/620 |
| 2003/0173675 A1 * | 9/2003 | Watanabe | G03F 1/26 |
| | | | 438/626 |
| 2004/0021227 A1 * | 2/2004 | Watanabe | H01L 23/481 |
| | | | 257/776 |
| 2004/0150073 A1 * | 8/2004 | Matumoto | H01L 23/28 |
| | | | 257/E23.116 |
| 2005/0087878 A1 * | 4/2005 | Uesugi | H01L 23/585 |
| | | | 257/E23.002 |
| 2005/0127395 A1 * | 6/2005 | Saigoh | H01L 23/564 |
| | | | 257/E21.664 |
| 2006/0055005 A1 * | 3/2006 | Furusawa | H01L 23/564 |
| | | | 257/637 |
| 2006/0102980 A1 * | 5/2006 | Nakashiba | H01L 21/823878 |
| | | | 257/508 |
| 2006/0163720 A1 * | 7/2006 | Hirata | H01L 23/562 |
| | | | 257/704 |
| 2008/0061397 A1 * | 3/2008 | Uchida | H01L 23/585 |
| | | | 257/508 |
| 2012/0074534 A1 * | 3/2012 | Lin | H01L 23/562 |
| | | | 438/464 |
| 2012/0161217 A1 | 6/2012 | Sato | |
| 2013/0037968 A1 * | 2/2013 | Ishida | H01L 23/564 |
| | | | 257/E23.179 |
| 2016/0013138 A1 * | 1/2016 | Chen | H01L 23/49816 |
| | | | 257/774 |
| 2016/0172359 A1 * | 6/2016 | Yoon | H01L 29/402 |
| | | | 257/401 |
| 2017/0084696 A1 | 3/2017 | Lee et al. | |
| 2017/0098630 A1 | 4/2017 | Park et al. | |
| 2017/0345773 A1 | 11/2017 | Baek et al. | |
| 2019/0067210 A1 * | 2/2019 | Polomoff | H01L 23/562 |
| 2019/0157282 A1 | 5/2019 | Jung | |
| 2022/0068885 A1 | 3/2022 | Lee | |

FOREIGN PATENT DOCUMENTS

| | | | | |
|---|---|---|---|---|
| CN | 105206613 A | | 12/2015 | |
| CN | 105702636 A | | 6/2016 | |
| CN | 109791915 A | * | 5/2019 | ......... H01L 21/3065 |
| DE | 102019117707 B4 | * | 12/2021 | .......... H01L 23/585 |
| EP | 2863430 B1 | * | 4/2017 | ....... H01L 21/76804 |
| KR | 1020050097142 A | | 10/2005 | |
| KR | 100670693 B1 | | 1/2007 | |
| KR | 101912290 B1 | | 10/2018 | |

* cited by examiner

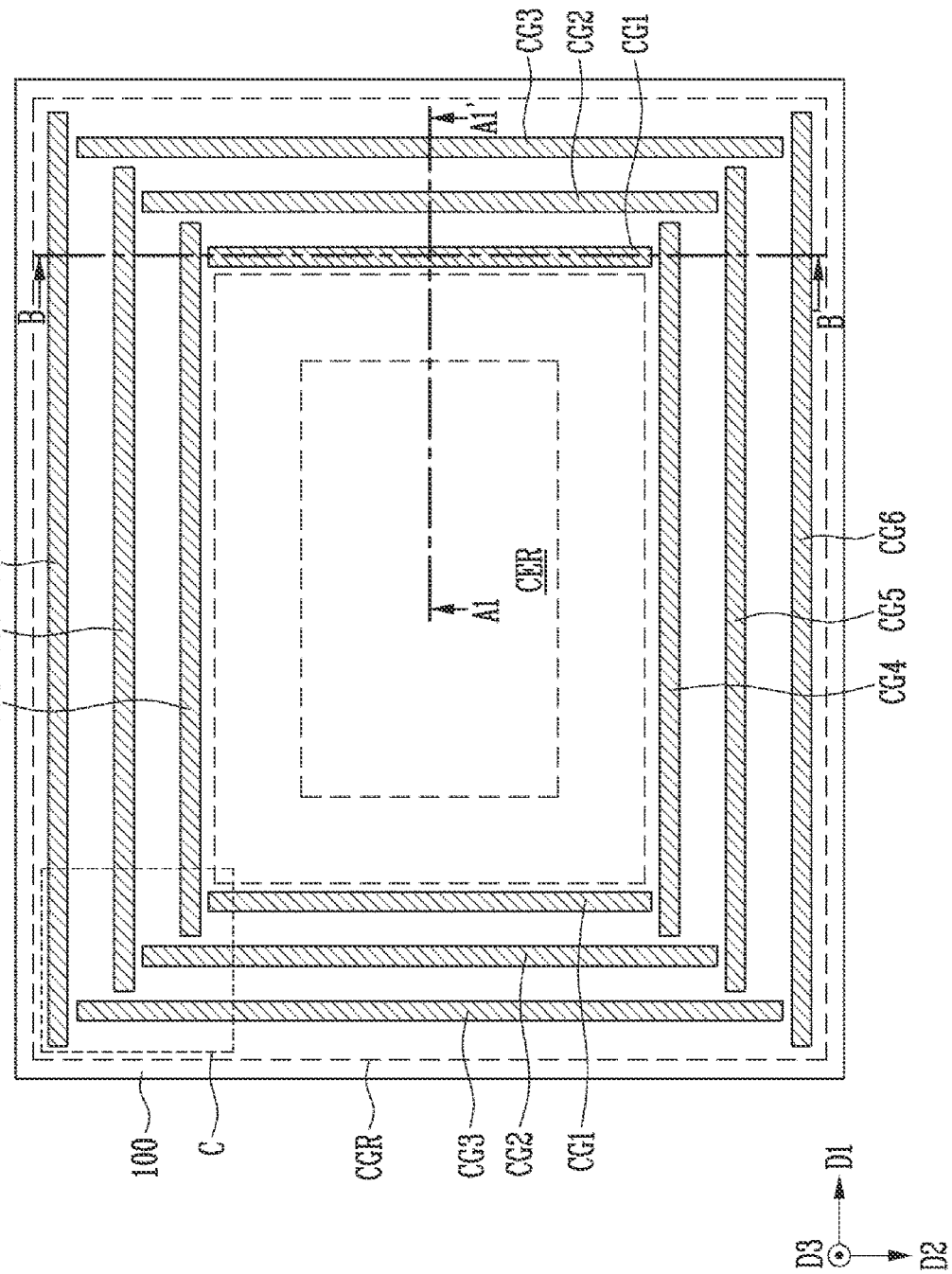

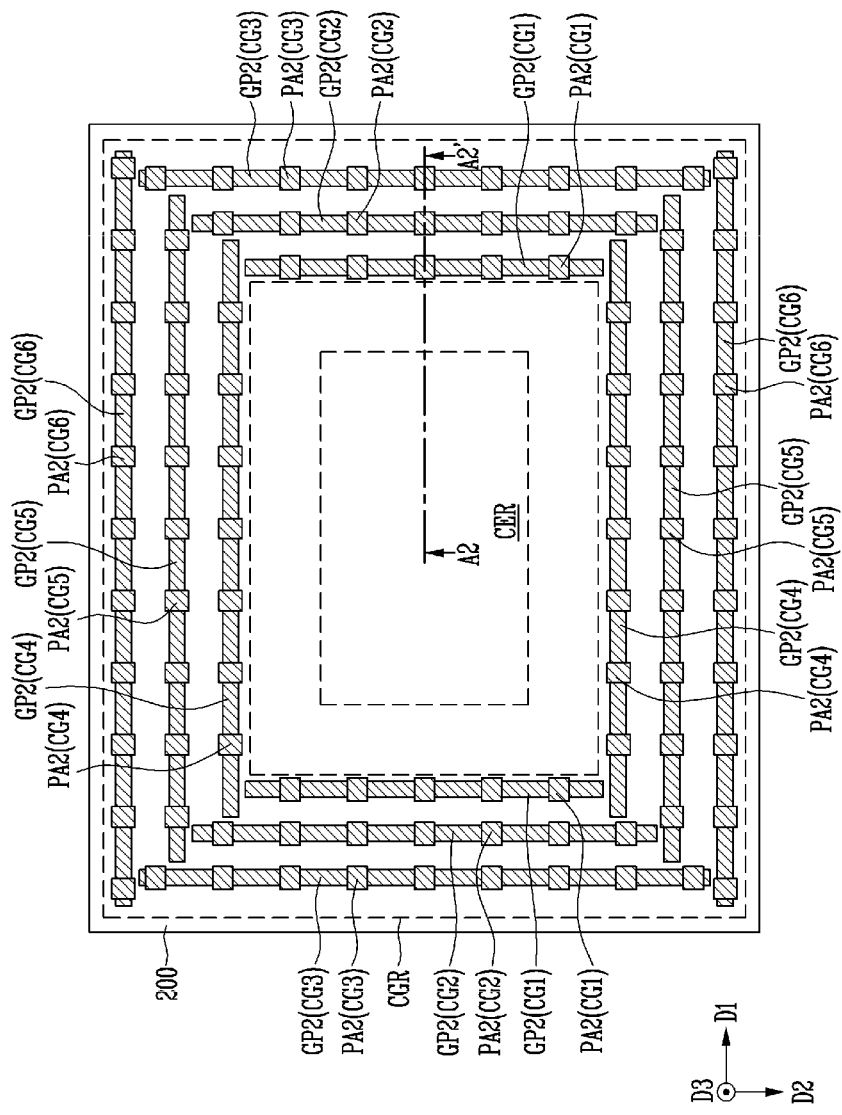

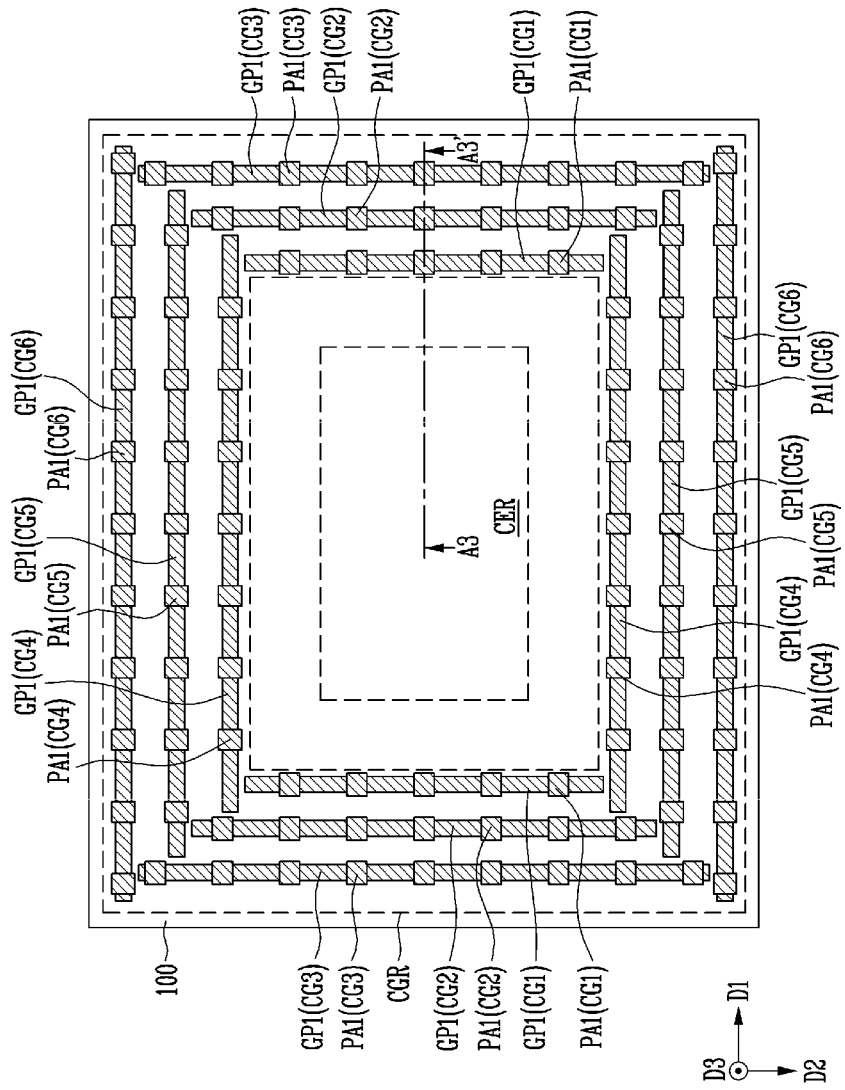

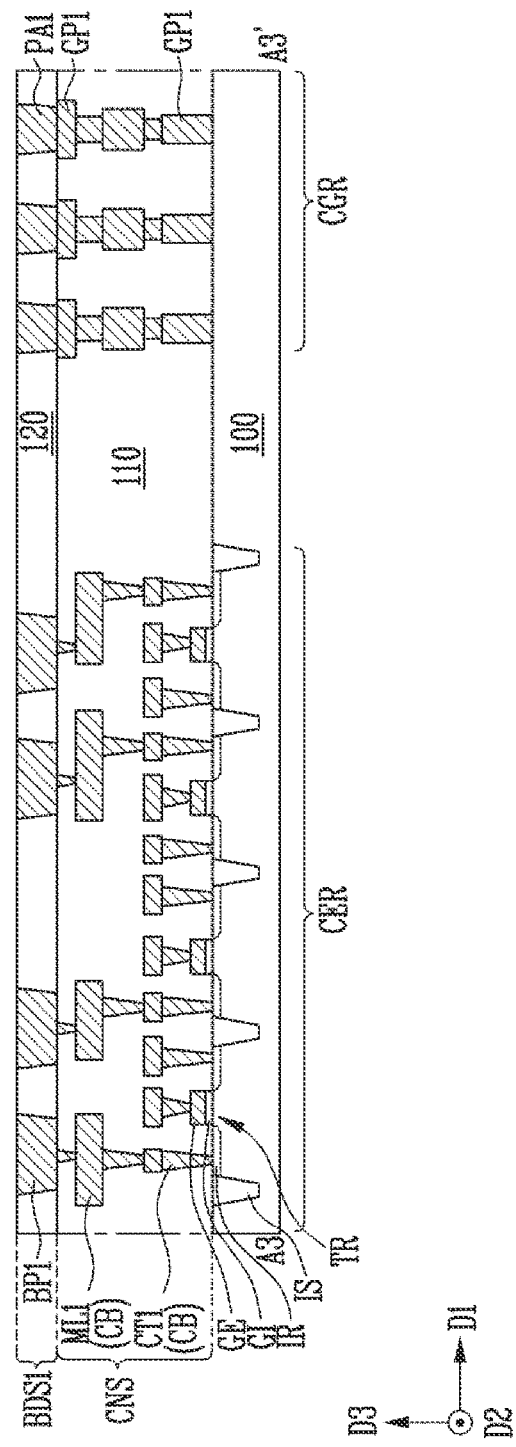

SEMICONDUCTOR DEVICE WITH MULTI-DIRECTIONAL CHIP GUARDS

CROSS-REFERENCE TO RELATED APPLICATION

The present application claims priority under 35 U.S.C. § 119(a) to Korean patent application number 10-2020-0109657 filed on Aug. 28, 2020, in the Korean Intellectual Property Office, the entire disclosure of which is incorporated by reference herein.

BACKGROUND

1. Technical Field

The present disclosure generally relates to a semiconductor device, and more particularly, to a three-dimensional semiconductor device.

2. Related Art

A semiconductor device includes memory cells that are capable of storing data. A three-dimensional semiconductor device includes three-dimensionally arranged memory cells so that an area that is occupied by memory cells per unit area of a substrate can be reduced.

In order to improve the degree of integration of the three-dimensional semiconductor device, a stacked number of memory cells may be increased. The operational reliability of the three-dimensional semiconductor device may deteriorate as the stacked number of memory cells is increased.

SUMMARY

In accordance with an aspect of the present disclosure, there is disposed a semiconductor device including: a substrate with a cell region and a chip guard region, the chip guard region surrounding the cell region; a first chip guard extending over the chip guard region in a first direction; a second chip guard extending over the chip guard region in the first direction, the second chip guard being spaced apart from the first chip guard; and a third chip guard extending over the chip guard region in a second direction, the second direction intersecting the first direction, wherein the first chip guard includes a first end portion, the second chip guard includes a second end portion, and the third chip guard includes a third end portion that is disposed between the first end portion and the second end portion.

In accordance with another aspect of the present disclosure, there is disposed a semiconductor device including: a substrate with a cell region and a chip guard region, the chip guard region surrounding the cell region; a first chip guard extending over the chip guard region in a first direction; a second chip guard extending over the chip guard region in the first direction, the second chip guard being spaced apart from the first chip guard; and a third chip guard extending over the chip guard region in a second direction, the second direction intersecting the first direction, wherein the first chip guard includes a first long sidewall extending in the first direction and a first short sidewall extending in the second direction, the second chip guard incudes a second long sidewall, extending in the first direction, and a second short sidewall, extending in the second direction, and the third chip guard includes a third long sidewall, extending in the second direction, and a third short sidewall, extending in the first direction, and wherein the first short sidewall faces the third long sidewall, and the third short sidewall faces the second long sidewall.

In accordance with still another aspect of the present disclosure, there is disposed a semiconductor device including: a connection structure with connection conductors and a first guard pattern; a semiconductor structure with a stack structure, cell plugs penetrating the stack structure, and a second guard pattern; and guard pads connecting the first guard pattern and the second guard pattern by being disposed between the first guard pattern and the second guard pattern, wherein the first guard pattern and the second guard pattern extend in a first direction, wherein the guard pads are spaced apart from each other in the first direction, and wherein a distance at which the guard pads are spaced apart from each other in the first direction is shorter than a length of the first guard pattern in the first direction and a length of the second guard pattern in the first direction.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are disposed so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1A is a plan view of a semiconductor device in accordance with an embodiment of the present disclosure.

FIGS. 2A and 3A are plan views, illustrating a manufacturing method of the semiconductor device, shown in FIGS. 1A to 1D.

FIG. 3B is a sectional view, taken along line A3-A3', shown in FIG. 3A.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Embodiments provide a semiconductor device including a chip guard region structure having improved environmental reliability.

It will be understood that although the terms "first", "second", "third" etc. are used herein to describe various elements, these elements should not be limited by these terms. These terms are only used to distinguish one element from another element. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1B:
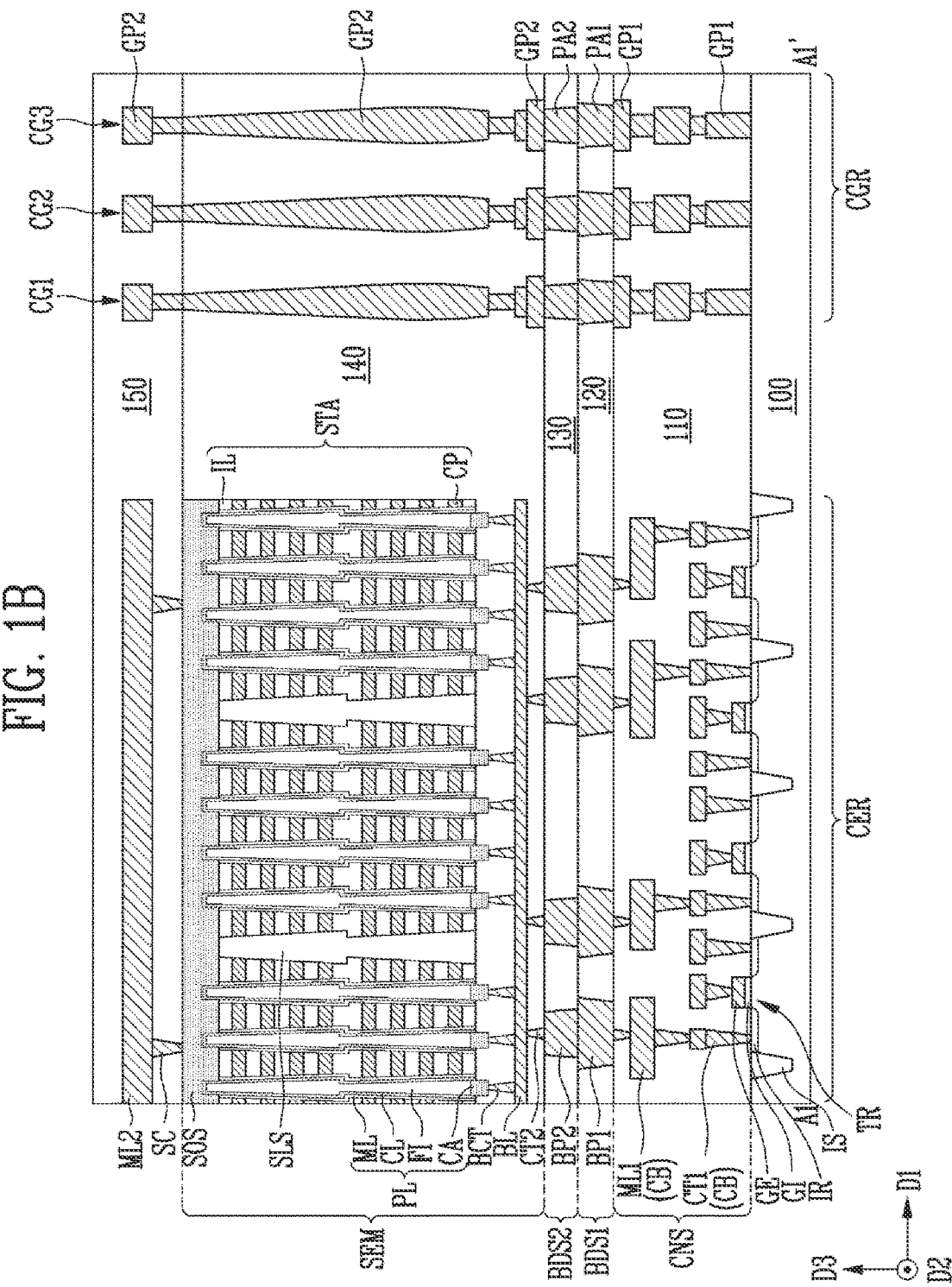
FIG. 1B is a sectional view, taken along line A1-A1', shown in FIG. 1A.
Figure 1C:
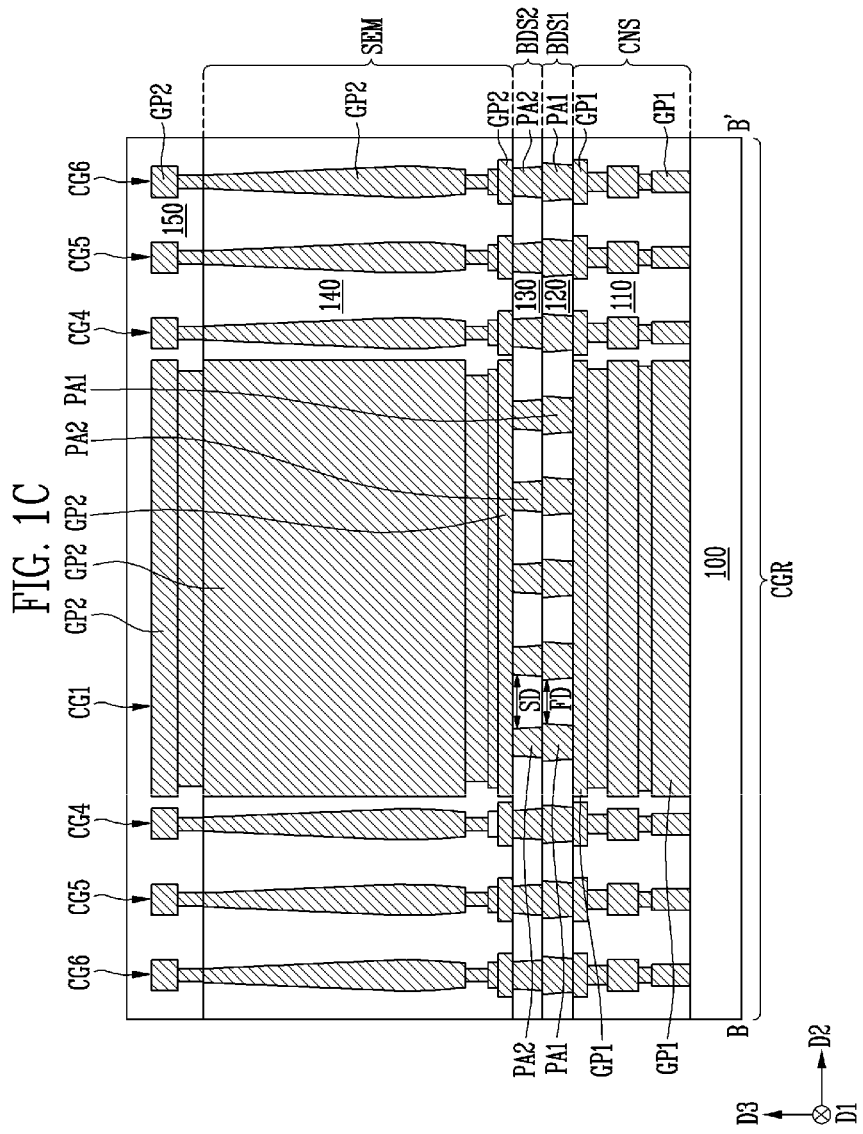
FIG. 1C is a sectional view, taken along line B-B', shown in FIG. 1A.
Figure 1D:
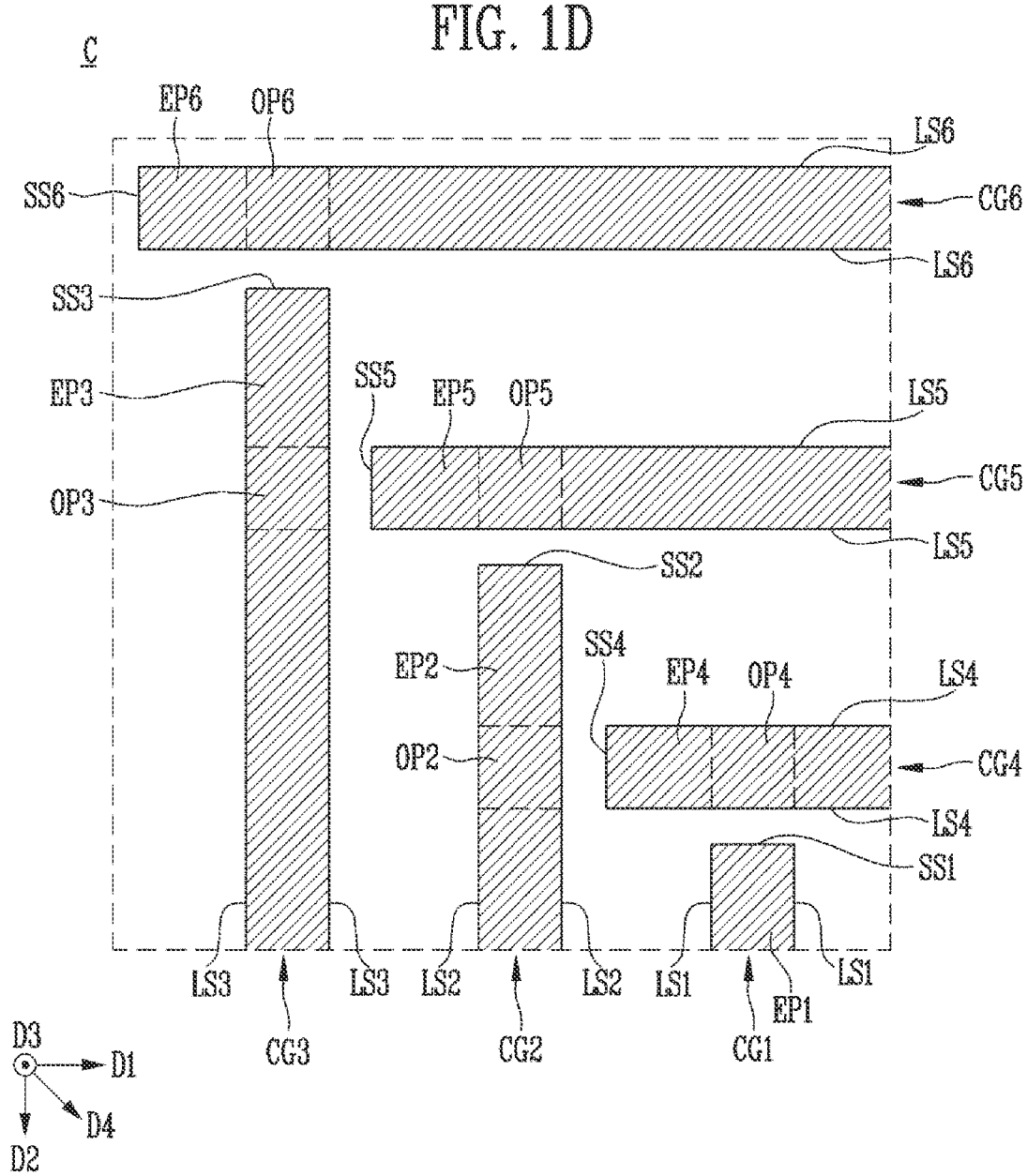
FIG. 1D is an enlarged view of region C, shown in FIG. 1A.

FIG. 1A is a plan view of a semiconductor device in accordance with an embodiment of the present disclosure. FIG. 1B is a sectional view, taken along line A1-A1', shown in FIG. 1A. FIG. 1C is a sectional view, taken along line B-B', shown in FIG. 1A. FIG. 1D is an enlarged view of region C, shown in FIG. 1A.

Referring to FIGS. 1A to 1C, the semiconductor device may include a first substrate 100. The first substrate 100 may have the shape of a plate that expands along a plane that is defined by a first direction D1 and a second direction D2. The first direction D1 and the second direction D2 may intersect each other. In an example, the first direction D1 and the second direction D2 may be orthogonal to each other. The first substrate 100 may be a semiconductor substrate. In an example, the first substrate 100 may be a silicon substrate.

The first substrate 100 may include a cell region CER and a chip guard region CGR. The cell region CER and the chip guard region CGR may be regions that are separated from each other in a two-dimensional view. The chip guard region CGR may surround the cell region CER.

A connection structure CNS may be disposed on the first substrate 100. The connection structure CNS may include a first insulating layer 110 and connection conductors CB. The first insulating layer 110 may cover the first substrate 100. The first insulating layer 110 may include an insulating material. In an example, the first insulating layer 110 may include oxide or nitride. The first insulating layer 110 may be a multi-layer with a plurality of insulating layers.

The connection conductors CB may be disposed in the first insulating layer 110. The connection conductors CB may be disposed over the cell region CER. The connection conductors CB may include first contacts CT1 and first lines ML1. The first contacts CT1 and the first lines ML1 may be connected to each other. The first contacts CT1 and the first lines ML1 may include a conductive material.

Transistors TR may be disposed between the connection structure CNS and the first substrate 100. The transistors TR may be disposed over the cell region CER. The transistors TR may be transistors within a peripheral circuit of the semiconductor device or may be connected to the peripheral circuit of the semiconductor device.

Each of the transistors TR may include impurity regions IR, a gate insulating layer GI, and a gate electrode GE. The impurity regions IR may be formed by doping an impurity into the first substrate 100. The impurity region IR may be connected to the connection conductor CB. The impurity region IR may be connected to the first contact CT1. The gate insulating layer GI may include an insulating material. In an example, the gate insulating layer GI may include oxide. The gate electrode GE may include a conductive material. The gate electrode GE may be connected to the connection conductor CB. The gate electrode GE may be connected to the first contact CT1.

Isolation layers IS may be disposed in the cell region CER of the first substrate 100. The isolation layers IS may electrically isolate the transistors TR from each other. The isolation layers IS may include an insulating material. In an example, the isolation layers IS may include oxide.

A first bonding structure BDS1 may be disposed on the connection structure CNS. The first bonding structure BDS1 may include second insulating layer 120 and first bonding pads BP1. The second insulating layer 120 may cover the first insulating layer 110. The second insulating layer 120 may include an insulating material. In an example, the second insulating layer 120 may include nitride or oxide.

The first bonding pad BP1 may be connected to the connection conductor CB in the connection structure CNS. The first bonding pad BP1 may be connected to the first contact CT1 in the connection structure CNS. The first bonding pads BP1 may be disposed over the cell region CER. The first bonding pads BP1 may be disposed in the second insulating layer 120. The first bonding pads BP1 may include a conductive material. In an example, the first bonding pads BP1 may include copper.

A second bonding structure BDS2 may be disposed on the first bonding structure BDS1. The second bonding structure BDS2 may include a third insulating layer 130 and second bonding pads BP2. The third insulating layer 130 may cover the second insulating layer 120. The third insulating layer 130 may include an insulating material. In an example, the third insulating layer 130 may include nitride or oxide.

The second bonding pad BP2 may be connected to the first bonding pad BP1 in the first bonding structure BDS1. The second bonding pads BP2 may be disposed over the cell region CER. The second bonding pads BP2 may be disposed in the third insulating layer 130. The second bonding pads BP2 may include a conductive material. In an example, the second bonding pads BP2 may include copper.

The width of the first bonding pad BP1 may widen as it approaches the second bonding pad BP2. In an example, the width of the first bonding pad BP1 in the first direction D1 may widen as it approaches the second bonding pad BP2. The width of the second bonding pad BP2 may widen as it approaches the first bonding pad BP1. In an example, the width of the second bonding pad BP2 in the first direction D1 may widen as it approaches the first bonding pad BP1.

A semiconductor structure SEM may be disposed on the second bonding structure BDS2. The semiconductor structure SEM may include a fourth insulating layer 140, second contacts CT2, a bit line BL, bit line contacts BCT, cell plugs PL, a stack structure STA, a slit structure SLS, and a source structure SOS. The second contacts CT2, the bit line BL, the bit line contacts BCT, the cell plugs PL, the stack structure STA, the slit structure SLS, and the source structure SOS may be disposed over the cell region CER. The second contacts CT2, the bit line BL, the bit line contacts BCT, the cell plugs PL, the stack structure STA, the slit structure SLS, and the source structure SOS may be disposed in the fourth insulating layer 140.

The fourth insulating layer 140 may cover the third insulating layer 130. The fourth insulating layer 140 may include an insulating material. In an example, the fourth insulating layer 140 may include oxide or nitride. The fourth insulating layer 140 may be a multi-layer with a plurality of insulating layers.

The second contacts CT2 may be connected to the second bonding pads BP2 in the second bonding structure BDS2. The second contacts CT2 may include a conductive material.

The bit line BL may be connected to the second contacts CT2. The bit line BL may extend in the first direction D1. The bit line BL may include a conductive material.

The bit line contacts BCT may be connected to the bit line BL. The bit line contacts BCT may include a conductive material.

The stack structure STA may include stacked insulating layers IL and conductive patterns CP, which are alternately stacked in a third direction D3. The conductive patterns CP may be used as word lines or select lines of the semiconductor device. The conductive patterns CP may include a conductive material. The stacked insulating layers IL may include an insulating material. In an example, the stacked insulating layers IL may include oxide.

The cell plugs PL may be connected to the bit line contacts BCT, respectively. The cell plugs PL may be electrically connected to the transistor TR through the bit line contact BCT, the bit line BL, the second contact CT2, the second bonding pad BP2, the first bonding pad BP1, the first contact CT1, and the first line ML1.

The cell plugs PL may extend in the third direction D3. The cell plugs PL may penetrate the stacked insulating layers IL and the conductive patterns CP of the stack structure STA in the third direction D3.

Each of the cell plugs PL may include a channel layer CL, a filling layer FI, a memory layer ML, and a capping pattern CA. The channel layer CL, the filling layer FI, and the memory layer ML may extend in the third direction D3 and may penetrate the stacked insulating layers IL and the conductive patterns CP of the stack structure STA. The channel layer CL may surround the filling layer FI, and the memory layer ML may surround the channel layer CL.

The filling layer FI may include an insulating material. In an example, the filling layer FI may include oxide. The channel layer CL may include a conductive material. In an example, the channel layer CL may include poly-silicon.

The memory layer ML may include a tunnel insulating layer that surrounds the channel layer CL, a data storage layer that surrounds the tunnel insulating layer, and a blocking layer that surrounds the data storage layer. The tunnel insulating layer may include a material through which charges can tunnel. In an example, the tunnel insulating layer may include oxide. In an embodiment, the data storage layer may include a material in which charges can be trapped. In an example, the data storage layer may include nitride. In another embodiment, the data storage layer may include various materials according to a data storage method. In an example, the data storage layer may include silicon, a phase change material, or nano dots. The blocking layer may include a material capable of blocking movement of charges. In an example, the blocking layer may include oxide.

The capping pattern CA may be connected to the bit line contact BCT. The capping pattern CA may be connected to the channel layer CL. The capping pattern CA may be disposed between the filling layer FI and the bit line contact BCT. The capping pattern CA may include a conductive material. The capping pattern CA may include the same material as the channel layer CL. In an example, the capping pattern CA may include poly-silicon.

The slit structures SLS may extend in the second direction D2 and the third direction D3. The slit structures SLS may extend in the third direction D3 and may penetrate the stack structure STA. Stacked insulating layers IL that are disposed at the same level may be isolated from each other in the first direction D1 by the slit structures SLS. Conductive patterns CP that are disposed at the same level may be isolated from each other in the first direction D1 by the slit structures SLS. The slit structures SLS may include an insulating material. In an example, the slit structures SLS may include oxide.

The source structure SOS may be disposed on the stack structure STA. The source structure SOS may have the shape of a plate, expanding along a plane that is defined by the first direction D1 and the second direction D2. The source structure SOS may be disposed over the cell region CER. The source structure SOS may be connected to the channel layers CL. The source structure SOS may include a conductive material. In an example, the source structure SOS may include poly-silicon.

A fifth insulating layer 150 may be disposed on the semiconductor structure SEM. The fifth insulating layer 150 may cover the semiconductor structure SEM. The fifth insulating layer 150 may include an insulating material. In an example, the fifth insulating layer 150 may include oxide or nitride.

Source contacts SC may be disposed in the fifth insulating layer 150. The source contacts SC may be connected to the source structure SOS. The source contacts SC may be disposed over the cell region CER. The source contacts SC may include a conductive material.

A second line ML2 may be disposed in the fifth insulating layer 150. The second line ML2 may be connected to the source contacts SC. The second line ML2 may be disposed over the cell region CER. The second line ML2 may include a conductive material.

First chip guards CG1, second chip guards CG2, third chip guards CG3, fourth chip guards CG4, fifth chip guards CG5, and sixth chip guards CG6 may be disposed in the first to fifth insulating layers 110, 120, 130, 140, and 150. The first to sixth chip guards CG1, CG2, CG3, CG4, CG5, and CG6 may penetrate the first to fourth insulating layers 110, 120, 130, and 140 from the fifth insulating layer 150 and extend down to the first substrate 100. The first to sixth chip guards CG1, CG2, CG3, CG4, CG5, and CG6 may extend in the third direction D3. The first to sixth chip guards CG1, CG2, CG3, CG4, CG5, and CG6 may penetrate the fourth insulating layer 140 of the semiconductor structure SEM, the third insulating layer 130 of the second bonding structure BDS2, the second insulating layer 120 of the first bonding structure BDS1, and the first insulating layer 110 of the connection structure CNS. The first to sixth chip guards CG1, CG2, CG3, CG4, CG5, and CG6 may be disposed over the chip guard region CGR. The number of the chip guards CG1, CG2, CG3, CG4, CG5, and CG6 is not limited to the chip guards that are shown in the drawings.

The first to third chip guards CG1, CG2, and CG3 may extend in the second direction D2. The first to third chip guards CG1, CG2, and CG3 may be spaced apart from each other in the first direction D1. Two first chip guards CG1 may be spaced apart from each other in the first direction D1. The cell region CER may be disposed between the two first chip guards CG1. The stack structure STA and the cell plugs PL may be disposed between the two first chip guards CG1. Two second chip guards CG2 may be spaced apart from each other in the first direction D1. The two first chip guards CG1 and the cell region CER may be disposed between the two second chip guards CG2. Two third chip guards CG3 may be spaced apart from each other in the first direction D1. The two first chip guards CG1, the two second chip guards CG2, and the cell region CER may be disposed between two third chip guards CG3. The first to third chip guards CG1, CG2, and CG3 may be parallel to each other.

The second chip guard CG2 may be disposed farther from the cell region CER than the first chip guard CG1. The third chip guard CG3 may be disposed farther from the cell region CER than the second chip guard CG2. The length of the second chip guard CG2 in the second direction D2 may be longer than that of the first chip guard CG1 in the second direction D2. The length of the third chip guard CG3 in the second direction D2 may be longer than that of the second chip guard CG2 in the second direction D2.

The fourth to sixth chip guards CG4, CG5, and CG6 may extend in the first direction D1. The fourth to sixth chip guards CG4, CG5, and CG6 may be spaced apart from each other in the second direction D2. The two first chip guards CG1 and the cell region CER may be disposed between two fourth chip guards CG4. The stack structure STA and the cell plugs PL may be disposed between the two fourth chip guards CG4. Two fifth chip guards CG5 may be spaced apart from each other in the second direction D2. The two fourth chip guards CG4, the two second chip guards CG2, the two first chip guards CG1, and the cell region CER may be disposed between the two fifth chip guards CG5. Two sixth chip guards CG6 may be spaced apart from each other in the second direction D2. The two fifth chip guards CG5, the two fourth chip guards CG4, the two third chip guards CG3, the two second chip guards CG2, the two first chip guards CG1, and the cell region CER may be disposed between the two sixth chip guards CG6. The fourth to sixth chip guards CG4, CG5, and CG6 may be parallel to each other.

The fifth chip guard CG5 may be disposed farther from the cell region CER than the fourth chip guard CG4. The sixth chip guard CG6 may be disposed farther from the cell region CER than the fifth chip guard CG5. The length of the fifth chip guard CG5 in the first direction D1 may be longer than that of the fourth chip guard CG4 in the first direction D1. The length of the sixth chip guard CG6 in the first direction D1 may be longer than that of the fifth chip guard CG5 in the first direction D1.

The cell region CER may be surrounded by the first chip guards CG1 and the fourth chip guards CG4. The cell region CER, the first chip guards CG1, and the fourth chip guards CG4 may be surrounded by the second chip guard CG2 and the fifth chip guards CG5. The cell region CER, the first chip guards CG1, the fourth chip guards CG4, the second chip guards CG2, and the fifth chip guards CG5 may be surrounded by the third chip guards CG3 and the sixth chip guards CG6.

Referring to FIG. 1D, the first chip guard CG1 may include first long sidewalls LS1 and first short sidewalls SS1. The first long sidewalls LS1 may be sidewalls that extend in the second direction D2. The first short sidewalls SS1 may be sidewalls that connect the first long sidewalls LS1. The length of the first long sidewalls LS1 may be longer than that of the first short sidewall SS1. The first chip guard CG1 may include first end portions EP1. Portions adjacent to the respective first short sidewalls SS1 of the first chip guard CG1 may be defined as the first end portions EP1. One of the sidewalls of the first end portion EP1 may be the first short sidewall SS1. In an embodiment, the first short sidewall SS1 may extend in the first direction D1.

The second chip guard CG2 may include second long sidewalls LS2 and second short sidewalls SS2. The second long sidewalls LS2 may be sidewalls that extend in the second direction D2. The second short sidewalls SS2 may be sidewalls that connect the second long sidewalls LS2. The length of the second long sidewalls LS2 may be longer than that of the second short sidewalls SS2. The second chip guard CG2 may include second end portions EP2. Portions that are adjacent to the respective second short sidewalls SS2 of the second chip guard CG2 may be defined as the second end portions EP2. One of the sidewalls of the second end portion EP2 may be the second short sidewall SS2. In an embodiment, the second short sidewall SS2 may extend in the first direction D1.

The third chip guard CG3 may include third long sidewalls LS3 and third short sidewalls SS3. The third long sidewalls LS3 may be sidewalls that extend in the second direction D2. The third short sidewalls SS3 may be sidewalls that connect the third long sidewalls LS3. The length of the third long sidewalls LS3 may be longer than that of the third short sidewalls SS3. The third chip guard CG3 may include third end portions EP3. Portions that are adjacent to the respective third short sidewalls SS3 of the third chip guard CG3 may be defined as the third end portions EP3. One of the sidewalls of the third end portion EP3 may be the third short sidewall SS3. In an embodiment, the third short sidewall SS3 may extend in the first direction D1.

The fourth chip guard CG4 may include fourth long sidewalls LS4 and fourth short sidewalls SS4. The fourth long sidewalls Ls4 may be sidewalls that extend in the first direction D1. The first short sidewalls SS4 may be sidewalls that connect the fourth long sidewalls LS4. The length of the fourth long sidewalls LS4 may be longer than that of the fourth short sidewalls SS4. The fourth chip guard CG4 may include fourth end portions EP4. Portions that are adjacent to the respective fourth short sidewalls SS4 of the fourth chip guard CG4 may be defined as the fourth end portions EP4. One of the sidewalls of the fourth end portion EP4 may be the fourth short sidewall SS4. In an embodiment, the fourth short sidewall SS4 may extend in the second direction D2.

The fifth chip guard CG5 may include fifth long sidewalls LS5 and fifth short sidewalls SS5. The fifth long sidewalls LS5 may be sidewalls that extend in the first direction D1. The fifth short sidewalls SS5 may be sidewalls that connect the fifth long sidewalls LS5. The length of the fifth long sidewalls LS5 may be longer than that of the fifth short sidewalls SS5. The fifth chip guard CG5 may include fifth end portions EP5. Portions that are adjacent to the respective fifth short sidewalls SS5 of the fifth chip guard CG5 may be defined as the fifth end portions EP5. One of the sidewalls of the fifth end portion EP5 may be the fifth short sidewall SS5. In an embodiment, the fifth short sidewall SS5 may extend in the second direction D2.

The sixth chip guard CG6 may include sixth long sidewalls LS6 and sixth short sidewalls SS6. The sixth long sidewalls LS6 may be sidewalls that extend in the first direction D1. The sixth short sidewalls SS6 may be sidewalls that connect the sixth long sidewalls LS6. The length of the sixth long sidewalls LS6 may be longer than that of the sixth short sidewalls SS6. The sixth chip guard CG6 may include sixth end portions EP6. Portions that are adjacent to the respective sixth short sidewalls SS6 of the sixth chip guard CG6 may be defined as the sixth end portions EP6. One of the sidewalls of the sixth end portion EP6 may be the sixth short sidewall SS6. In an embodiment, the sixth short sidewall SS6 may extend in the second direction D2.

The fourth short sidewall SS4 may be disposed between the first and second long sidewalls LS1 and LS2 facing each other. The fourth short sidewall SS4 may be disposed closer to the second long sidewall LS2 than the first long sidewall LS1. The second short sidewall SS2 may be disposed between the fourth and fifth long sidewalls LS4 and LS5 facing each other. The second short sidewall SS2 may be disposed closer to the fifth long sidewall LS5 than the fourth long sidewall LS4. The fifth short sidewall SS5 may be disposed between the second and third long sidewalls LS2 and LS3 facing each other. The fifth short sidewall SS5 may be disposed closer to the third long sidewall LS3 than the second long sidewall LS2. The third short sidewall SS3 may be disposed between the fifth and sixth long sidewalls LS5 and LS6 facing each other. The third short sidewall SS3 may be disposed closer to the sixth long sidewall LS6 than the fifth long sidewall LS5.

A fourth direction D4 may intersect the first direction D1, the second direction D2, and the third direction D3. In an example, the fourth direction D4 may form an angle of 45 degrees with respect to the first direction D1, form an angle of 45 degrees with respect to the second direction D2, and may be orthogonal to the third direction D3.

The fourth end portion EP4 of the fourth chip guard CG4 may be disposed between the first end portion EP1 of the first chip guard CG1 and the second end portion EP2 of the second chip guard CG2. A virtual line in the fourth direction D4, which connects the first end portion EP1 of the first chip guard CG1 and the second end portion EP2 of the second chip guard CG2, and the fourth end portion EP4 of the fourth chip guard CG4 may overlap with each other. The virtual line in the fourth direction D4, which connects the first end portion EP1 of the first chip guard CG1 and the second end portion EP2 of the second chip guard CG2, may traverse the fourth end portion EP4 of the fourth chip guard CG4. The second end portion EP2 of the second chip guard CG2 may be disposed between the fourth end portion EP4 of the fourth chip guard CG4 and the fifth end portion EP5 of the fifth chip guard CG5. The fifth end portion EP5 of the fifth chip guard CG5 may be disposed between the second end portion EP2 of the second chip guard CG2 and the third end portion EP3 of the third chip guard CG3. The third end portion EP3 of the third chip guard CG3 may be disposed between the fifth end portion EP5 of the fifth chip guard CG5 and the sixth end portion EP6 of the sixth chip guard CG6.

The fourth end portion EP4 of the fourth chip guard CG4 may be disposed farther from the cell region CER than the first end portion EP1 of the first chip guard CG1. The second end portion EP2 of the second chip guard CG2 may be disposed farther from the cell region CER than the fourth end portion EP4 of the fourth chip guard CG4. The fifth end portion EP5 of the fifth chip guard CG5 may be disposed farther from the cell region CER than the second end portion EP2 of the second chip guard CG2. The third end portion EP3 of the third chip guard CG3 may be disposed farther from the cell region CER than the fifth end portion EP5 of the fifth chip guard CG5. The sixth end portion EP6 of the sixth chip guard CG6 may be disposed farther from the cell region CER than the third end portion EP3 of the third chip guard CG3.

The fourth short sidewall SS4 of the fourth chip guard CG4 may be disposed farther from the cell region CER than the first short sidewall SS1 of the first chip guard CG1. The second short sidewall SS2 of the second chip guard CG2 may be disposed farther from the cell region CER than the fourth short sidewall SS4 of the fourth chip guard CG4. The fifth short sidewall SS5 of the fifth chip guard CG5 may be disposed farther from the cell region CER than the second short sidewall SS2 of the second chip guard CG2. The third short sidewall SS3 of the third chip guard CG3 may be disposed farther from the cell region CER than the fifth short sidewall SS5 of the fifth chip guard CG5. The sixth short sidewall SS6 of the sixth chip guard CG6 may be disposed farther from the cell region CER than the third short sidewall SS3 of the third chip guard CG3.

The first short sidewall SS1 of the first chip guard CG1 may face the fourth long sidewall LS4 of the fourth chip guard CG4. The first short sidewall SS1 of the first chip guard CG1 may be spaced apart from the fourth long sidewall LS4 of the fourth chip guard CG4 in the second direction D2. The fourth short sidewall SS4 of the fourth chip guard CG4 may face the second long sidewall LS2 of the second chip guard CG2. The fourth short sidewall SS4 of the fourth chip guard CG4 may be spaced apart from the second long sidewall LS2 of the second chip guard CG2 in the first direction D1. The second short sidewall SS2 of the second chip guard CG2 may face the fifth long sidewall LS5 of the fifth chip guard CG5. The second short sidewall SS2 of the second chip guard CG2 may be spaced apart from the fifth long sidewall LS5 of the fifth chip guard CG5 in the second direction D2. The fifth short sidewall SS5 of the fifth chip guard CG5 may face the third long sidewall LS3 of the third chip guard CG3. The fifth short sidewall SS5 of the fifth chip guard CG5 may be spaced apart from the third long sidewall LS3 of the third chip guard CG3 in the first direction. The third short sidewall SS3 of the third chip guard CG3 may face the sixth long sidewall LS6 of the sixth chip guard CG6. The third short sidewall SS3 of the third chip guard CG3 may be spaced apart from the sixth long sidewall LS6 of the sixth chip guard CG6 in the second direction D2.

The first chip guard CG1 may overlap with the fourth chip guard CG4, the fifth chip guard CG5, and the sixth chip guard CG6 in the second direction D2. The fourth chip guard CG4 may overlap with the second chip guard CG2 and the third chip guard CG3 in the first direction D1. The second chip guard CG2 may overlap with the fifth chip guard CG5 and the sixth chip guard CG6 in the second direction D2. The fifth chip guard CG5 may overlap with the third chip guard CG3 in the first direction D1. The third chip guard CG3 may overlap with the sixth chip guard CG6 in the second direction D2.

The fourth chip guard CG4 may include a fourth overlapping portion OP4 that overlaps with the first chip guard CG1 in the second direction D2. The fourth overlapping portion OP4 may be connected to the fourth end portion EP4. The second chip guard CG2 may include a second overlapping portion OP2 that overlaps with the fourth chip guard CG4 in the first direction D1. The second overlapping portion OP2 may be connected to the second end portion EP2. The fifth chip guard CG5 may include a fifth overlapping portion OP5 that overlaps with the second chip guard CG2 in the second direction D2. The fifth overlapping portion OP5 may be connected to the fifth end portion EP5. The third chip guard CG3 may include a third overlapping portion OP3 that overlaps with the fifth chip guard CG5 in the first direction D1. The third overlapping portion OP3 may be connected to the third end portion EP3. The sixth chip guard CG6 may include a sixth overlapping portion OP6 that overlaps with the third chip guard CG3 in the second direction D2. The sixth overlapping portion OP6 may be connected to the sixth end portion EP6.

The fourth end portion EP4 of the fourth chip guard CG4 may be disposed between the fourth overlapping portion OP4 of the fourth chip guard CG4 and the second overlapping portion OP2 of the second chip guard CG2. The fourth end portion EP4 of the fourth chip guard CG4 may be disposed adjacent to the second chip guard CG2. The second end portion EP2 of the second chip guard CG2 may be disposed between the second overlapping portion OP2 of the second chip guard CG2 and the fifth overlapping portion OP5 of the fifth chip guard CG5. The second end portion EP2 of the second chip guard CG2 may be disposed adjacent to the fifth chip guard CG5. The fifth end portion EP5 of the fifth chip guard CG5 may be disposed between the fifth overlapping portion OP5 of the fifth chip guard CG5 and the third overlapping portion OP3 of the third chip guard CG3. The fifth end portion EP5 of the fifth chip guard CG5 may be disposed adjacent to the third chip guard CG3. The third end portion EP3 of the third chip guard CG3 may be disposed between the third overlapping portion OP3 of the third chip guard CG3 and the sixth overlapping portion OP6 of the sixth chip guard CG6. The third end portion EP3 of the third chip guard CG3 may be disposed adjacent to the sixth chip guard CG6.

The first short sidewall SS1 of the first chip guard CG1 may overlap with the fourth long sidewall LS4 of the fourth chip guard CG4, the fifth long sidewall LS5 of the fifth chip guard CG5, and the sixth long sidewall LS6 of the sixth chip guard CG6 in the second direction D2. The fourth short sidewall SS4 of the fourth chip guard CG4 may overlap with the second long sidewall LS2 of the second chip guard CG2 and the third long sidewall LS3 of the third chip guard CG3 in the first direction D1. The second short sidewall SS2 of the second chip guard CG2 may overlap with the fifth long sidewall LS5 of the fifth chip guard CG5 and the sixth long sidewall LS6 of the sixth chip guard CG6 in the second direction D2. The fifth short sidewall SS5 of the fifth chip guard CG5 may overlap with the third long sidewall LS3 of the third chip guard CG3 in the first direction D1. The third short sidewall SS3 of the third chip guard CG3 may overlap with the sixth long sidewall LS6 of the sixth chip guard CG6 in the second direction D2.

Referring back to FIGS. 1B, and 1C, each of the first to sixth chip guards CG1, CG2, CG3, CG4, CG5, and CG6 may include first guard patterns GP1, first guard pads PA1, second guard pads PA2, and second guard patterns GP2. The first guard patterns GP1, the first guard pads PA1, the second guard pads PA2, and the second guard patterns GP2 of each of the first to sixth chip guards CG1, CG2, CG3, CG4, CG5, and CG6 may be sequentially stacked in the third direction D3 to be connected to each other.

The first guard patterns GP1 may be disposed in the connection structures CNS. The first guard patterns GP1 may be included in the connection structure CNS. The first guard patterns GP1 may be disposed in the first insulating layers 110. The first guard patterns GP1 of each of the first to sixth chip guards CG1, CG2, CG3, CG4, CG5, and CG6 may be stacked in the third direction D3. The first guard patterns GP1 of the first to third chip guards CG1, CG2, and CG3 may extend in the second direction D2. The first guard patterns GP1 of the fourth to sixth chip guards CG4, CG5, and CG6 may extend in the first direction D1. The first guard patterns GP1 may include a conductive material. In an example, the first guard patterns GP1 may include copper, aluminum or tungsten.

The second guard patterns GP2 may be disposed in the fourth insulating layer 140 of the semiconductor structure SEM and the fifth insulating layer 150. Some of the second guard patterns GP2 may be included in the semiconductor structure SEM. The second guard patterns GP2 of each of the first to sixth chip guards CG1, CG2, CG3, CG4, CG5, and CG6 may be stacked in the third direction D3. The second guard patterns GP2 of the first to third chip guards CG1, CG2, and CG3 may extend in the second direction D2. The second guard patterns GP2 of the fourth to sixth chip guards CG4, CG5, and CG6 may extend in the first direction D1. The second guard patterns GP2 may include a conductive material. In an example, the second guard patterns GP2 may include copper, aluminum or tungsten.

The first guard pads PA1 may be disposed between the first guard patterns GP1 and the second guard patterns GP2. A plurality of first guard pads PA1 may be disposed between the first guard pattern GP1 and the second guard pattern GP2 of each of the first to sixth chip guards CG1, CG2, CG3, CG4, CG5, and CG6. The first guard pads PA1 may be disposed in the second insulating layer 120 of the first bonding structure BDS1. The first guard pads PA1 of each of the first to sixth chip guards CG1, CG2, CG3, CG4, CG5, and CG6 may be disposed on the first guard pattern GP1.

The first guard pads PA1 of each of the first to third chip guards CG1, CG2, and CG3 may be arranged in the second direction D2. The first guard pads PA1 of each of the first to third chip guards CG1, CG2, and CG3 may be evenly spaced apart from each other in the second direction D2. Portions of the second insulating layer 120 may be disposed between the first guard pads PA1 of each of the first to third chip guards CG1, CG2, and CG3. The second insulating layer 120 may be filled between the first guard pads PA1 of each of the first to third chip guards CG1, CG2, and CG3.

The first guard pads PA1 of each of the fourth to sixth chip guards CG4, CG5, and CG6 may be arranged in the first direction D1. The first guard pads PA1 of each of the fourth to sixth chip guards CG4, CG5, and CG6 may be evenly spaced apart from each other in the first direction D1. Portions of the second insulating layer 120 may be disposed between the first guard pads PA1 of each of the fourth to sixth chip guards CG4, CG5, and CG6. The second insulating layer 120 may be filled between the first guard pads PA1 of each of the fourth to sixth chip guards CG4, CG5, and CG6.

The first guard pads PA1 may be disposed at the same level as the first bonding pads BP1. The first guard pads PA1 may include a conductive material. In an example, the first guard pads PA1 may include copper.

The second guard pads PA2 may be disposed between the first guard patterns GP1 and the second guard patterns GP2. A plurality of second guard pads PA2 may be disposed between the first guard pattern GP1 and the second guard pattern GP2 of each of the first to sixth chip guards CG1, CG2, CG3, CG4, CG5, and CG6. The second guard pads PA2 may be disposed in the third insulating layer 130 of the second bonding structure BDS2. The second guard pads PA2 of each of the first to sixth chip guards CG1, CG2, CG3, CG4, CG5, and CG6 may be disposed on the first guard pads PA1 of each of the first to sixth chip guards CG1, CG2, CG3, CG4, CG5, and CG6.

The second guard pads PA2 of each of the first to third chip guards CG1, CG2, and CG3 may be arranged in the second direction D2. The second guard pads PA2 of each of the first to third chip guards CG1, CG2, and CG3 may be evenly spaced apart from each other in the second direction D2. Portions of the third insulating layer 130 may be disposed between the second guard pads PA2 of each of the first to third chip guards CG1, CG2, and CG3. The third insulating layer 130 may be filled between the second guard pads PA2 of each of the first to third chip guards CG1, CG2, and CG3.

The second guard pads PA2 of each of the fourth to sixth chip guards CG4, CG5, and CG6 may be arranged in the first direction D1. The second guard pads PA2 of each of the fourth to sixth chip guards CG4, CG5, and CG6 may be evenly spaced apart from each other in the first direction D1. Portions of the third insulating layer 130 may be disposed between the second guard pads PA2 of each of the fourth to sixth chip guards CG4, CG5, and CG6. The third insulating layer 130 may be filled between the second guard pads PA2 of each of the fourth to sixth chip guards CG4, CG5, and CG6.

The second guard pads PA2 may be disposed at the same level as the second bonding pads BP2. The second guard pads PA2 may be disposed at a level different from that of the first guard pads PAL. The second guard pads PA2 may include a conductive material. In an example, the second guard pads PA2 may include copper.

The width of the first guard pad PA1 may widen as it approaches the second guard pad PA2. In an example, the width of the first guard pad PA1 in the first direction D1 may widen as it approaches the second guard pad PA2. The width of the second guard pad PA2 may widen as it approaches the first guard pad PAL. In an example, the width of the second guard pad PA2 in the first direction D1 may widen as it approaches the first guard pad PA1.

In each of the first to third chip guards CG1, CG2, and CG3, the distance at which two first guard pads PA1, adjacent to each other, are spaced apart from each other in the second direction D2 and the distance at which two second guard pads PA2, adjacent to each other, are spaced apart from each other in the second direction D2 may be shorter than the length by which the first guard pattern GP1 extends in the first direction D1 and the length by which the second guard pattern GP2 extends in the first direction D1.

In an example, referring to FIG. 1C, two adjacent first guard pads PA1 of the first chip guard CG1 may be spaced apart from each other at a first distance FD in the second direction D2, and two adjacent second guard pads PA2 of the first chip guard CG1 may be spaced apart from each other by a second distance SD in the second direction D2. The length of the first guard pattern GP1 of the first chip guard CG1 in the second direction D2 may be longer than the first distance FD and the second distance SD. The length of the second guard pattern GP2 of the first chip guard CG1 in the second direction D2 may be longer than the first distance FD and the second distance SD.

In the semiconductor device, in accordance with this embodiment, since the first to sixth chip guards CG1, CG2, CG3, CG4, CG5, and CG6 are spaced apart from each other in an end region of the chip guard region CGR, the first to sixth chip guards CG1, CG2, CG3, CG4, CG5, and CG6 might not be formed in any closed curve shape in the edge region of the chip guard region CGR. Accordingly, the stress which may occur in the first to sixth chip guards CG1, CG2, CG3, CG4, CG5, and CG6 in the edge region of the chip guard region CGR may be reduced as compared to a case in which the first to sixth chip guards CG1, CG2, CG3, CG4, CG5, and CG6 are formed in a closed curve shape. In other words, cracks due to stress concentration may be prevented.

In the semiconductor device, in accordance with this embodiment, since the first to sixth chip guards CG1, CG2, CG3, CG4, CG5, and CG6 intersect each other and overlap with each other along the first direction D1 and the second direction D2, the over-described components that are disposed over the cell region CER may be effectively protected.

In the semiconductor device, in accordance with this embodiment, since the first guard pads PA1 are arranged to be spaced apart from each other and the second guard pads PA2 are arranged to be spaced apart from each other, the first and second guard pads PA1 and PA2 may be smoothly bonded through a wafer bonding process.

Figure 2B:
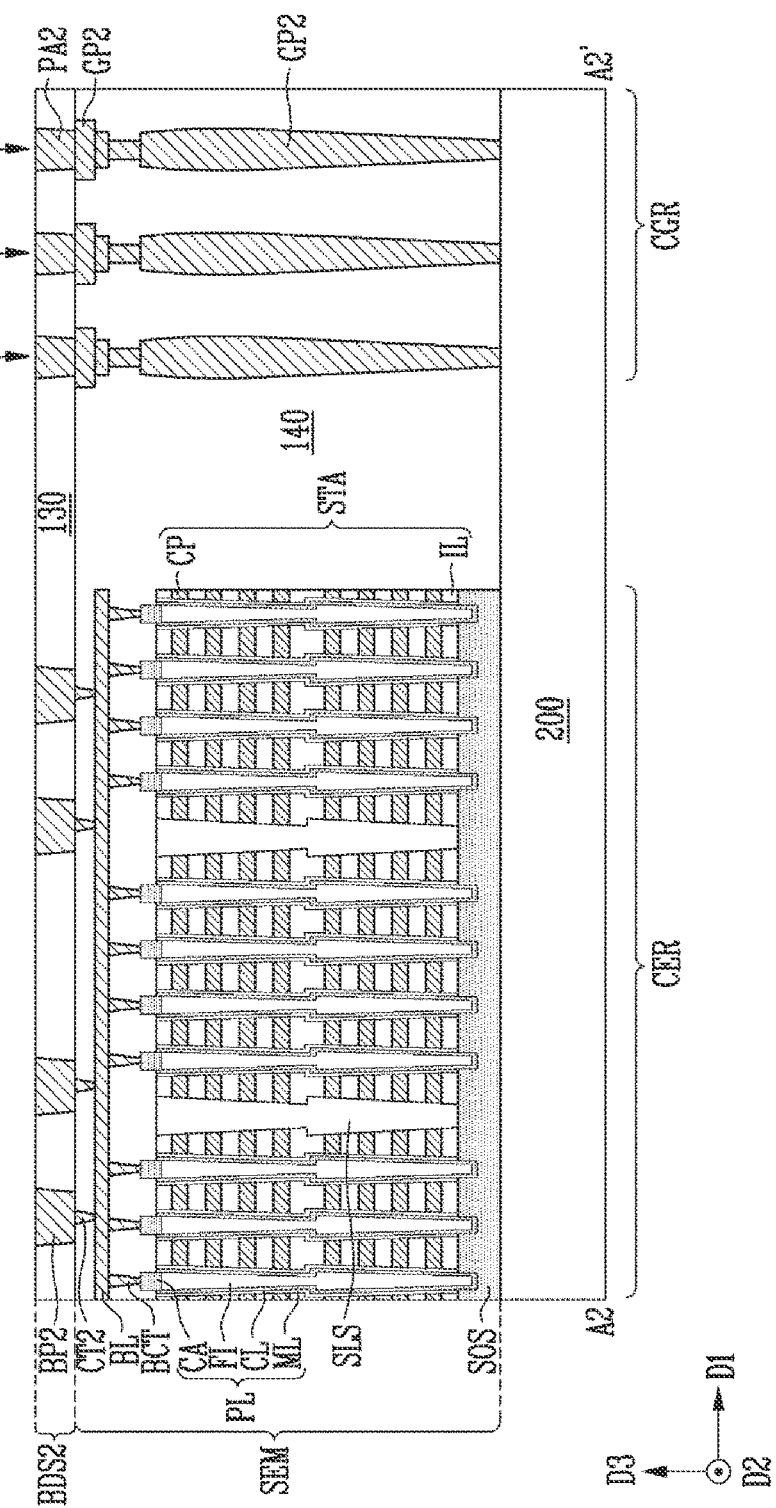
FIG. 2B is a sectional view, taken along line A2-A2', shown in FIG. 2A.
Figure 4:
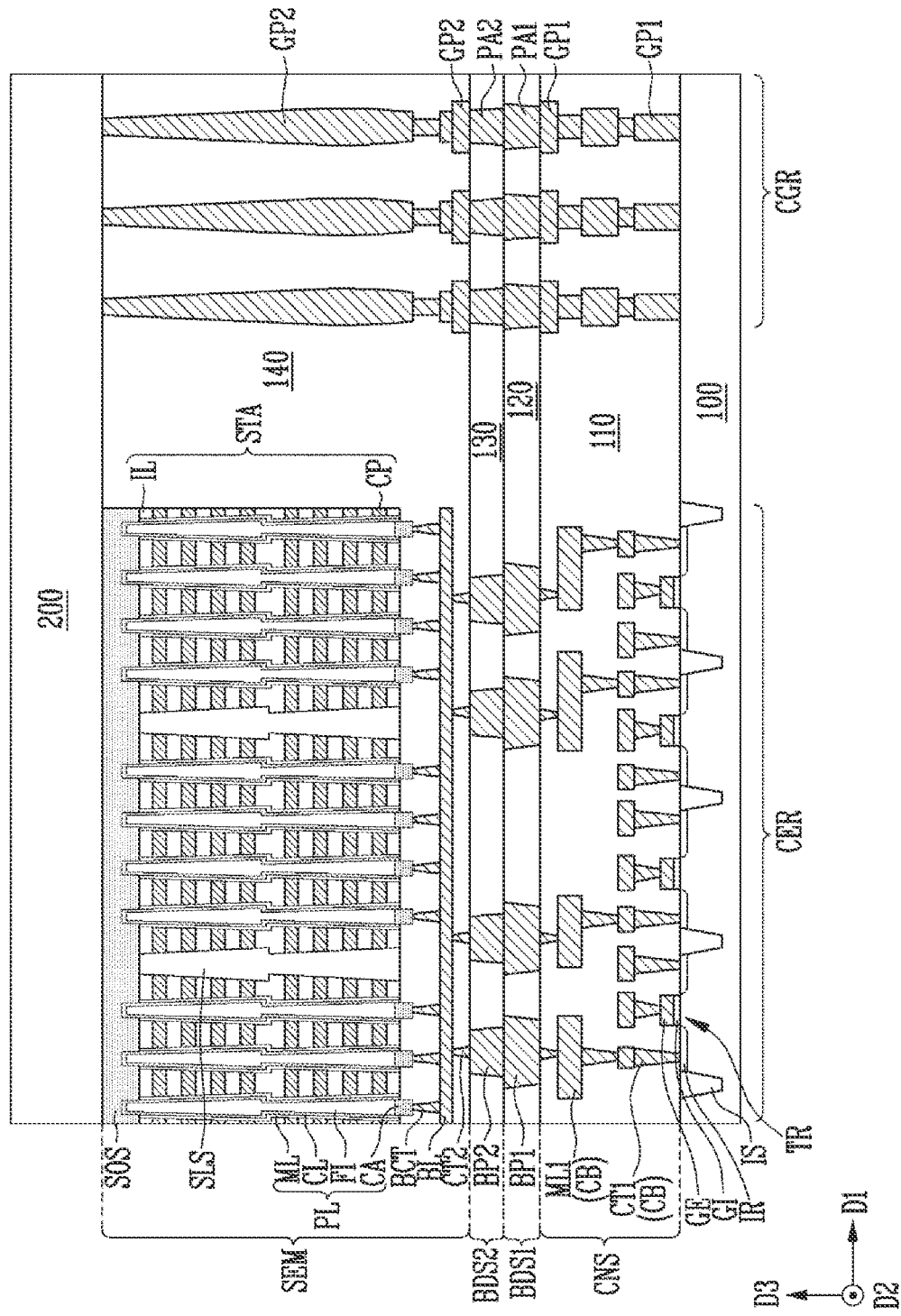
FIG. 4 is a sectional view, illustrating the manufacturing method of the semiconductor device, shown in FIGS. 1A to 1D.

FIGS. 2A and 3A are plan views, illustrating a manufacturing method of the semiconductor device, shown in FIGS. 1A to 1D. FIG. 2B is a sectional view, taken along line A2-A2', shown in FIG. 2A. FIG. 3B is a sectional view, taken along line A3-A3', shown in FIG. 3A. FIG. 4 is a sectional view, illustrating the manufacturing method of the semiconductor device, shown in FIGS. 1A to 1D.

For convenience of description, overlapping descriptions of the components described with reference to FIGS. 1A to 1D will be omitted.

A manufacturing method, described below, is merely one embodiment of the manufacturing method of the semiconductor device shown in FIGS. 1A to 1D, and the manufacturing method of the semiconductor device shown in FIGS. 1A to 1D might not be limited to that described below.

Referring to FIGS. 2A and 2B, a second substrate 200 may be formed. The second substrate 200 may have the shape of a plate, expanding along a plane that is defined by the first direction D1 and the second direction D2. In an example, the second substrate 200 may be a semiconductor substrate or an insulator substrate.

A semiconductor structure SEM may be formed on the second substrate 200. The forming of the semiconductor structure SEM may include forming a source structure SOS on the second substrate 200, forming, on the source structure SOS, a stack structure STA with sacrificial layers and stacked insulating layers IL, forming cell plugs PL that penetrate the stack structure STA, replacing the sacrificial layers of the stack structure STA with conductive patterns CP, forming a slit structure SLS, forming bit line contact BCT that is connected to the cell plugs PL and a bit line BL, and forming a fourth insulating layer 140. The fourth insulating layer 140 may include a plurality of insulating layers that are necessary in the process of forming the source structure SOS, the stack structure STA, the cell plugs PL, the slit structure SLS, the bit line contacts BCT, and the bit line BL.

Second guard patterns GP2 may be formed, which are disposed in the fourth insulating layer 140. The second guard patterns GP2 of each of first to sixth chip guards CG1, CG2, CG3, CG4, CG5, and CG6 may be sequentially formed by using the plurality of insulating layers of the fourth insulating layer 140.

A second bonding structure BDS2 may be formed on the semiconductor structure SEM. The forming of the second bonding structure BDS2 may include forming a third insulating layer 130 that covers the semiconductor structure SEM and forming second bonding pads BP2 and second guard pads PA2, which penetrate the third insulating layer 130.

Referring to FIGS. 3A and 3B, a first substrate 100 may be formed.

Subsequently, transistors TR and a connection structure CNS may be formed on the first substrate 100. The forming of the transistors TR and the connection structure CNS may include forming the transistors TR on the first substrate 100, forming connection conductors CB that are connected to the transistors TR, and forming a first insulating layer 110. The first insulating layer 110 may include a plurality of insulating layers that are necessary in the process of forming the transistors TR and the connection conductors CB.

First guard patterns GP1 of each of the first to sixth chip guards CG1, CG2, CG3, CG4, CG5, and CG6 may be formed on the substrate 100. The first guard patterns GP1 of each of the first to sixth chip guards CG1, CG2, CG3, CG4, CG5, and CG6 may be sequentially formed by using the plurality of insulating layers of the first insulating layer 110.

A first bonding structure BDS1 may be formed on the connection structure CNS. The forming of the first bonding structure BDS1 may include forming a second insulating layer 120 that covers the connection structure CNS and forming first bonding pads BP1 and first guard pads PA1, which penetrate the second insulating layer 120.

Referring to FIG. 4, after the second substrate 200, the semiconductor structure SEM, and the second bonding structure BDS2 are reversed, the second bonding structure BDS2 and the first bonding structure BDS1 may be bonded to each other. Accordingly, the second bonding pads BP2 of the second bonding structure BDS2 and the first bonding pads BP1 of the first bonding structure BDS1 may be bonded to each other, the second guard pads PA2 of the second bonding structure BDS2 and the first guard pads PA1 of the first bonding structure BDS1 may be bonded to each other, and the second insulating layer 120 and the third insulating layer 130 may be bonded to each other.

Subsequently, after the second substrate 200 is removed, a fifth insulating layer 150, a source contact SC, and a second line ML2 may be formed, and second guard patterns GP2 disposed in the fifth insulating layer 150 may be formed (see FIGS. 1B and 1C).

Figure 5:
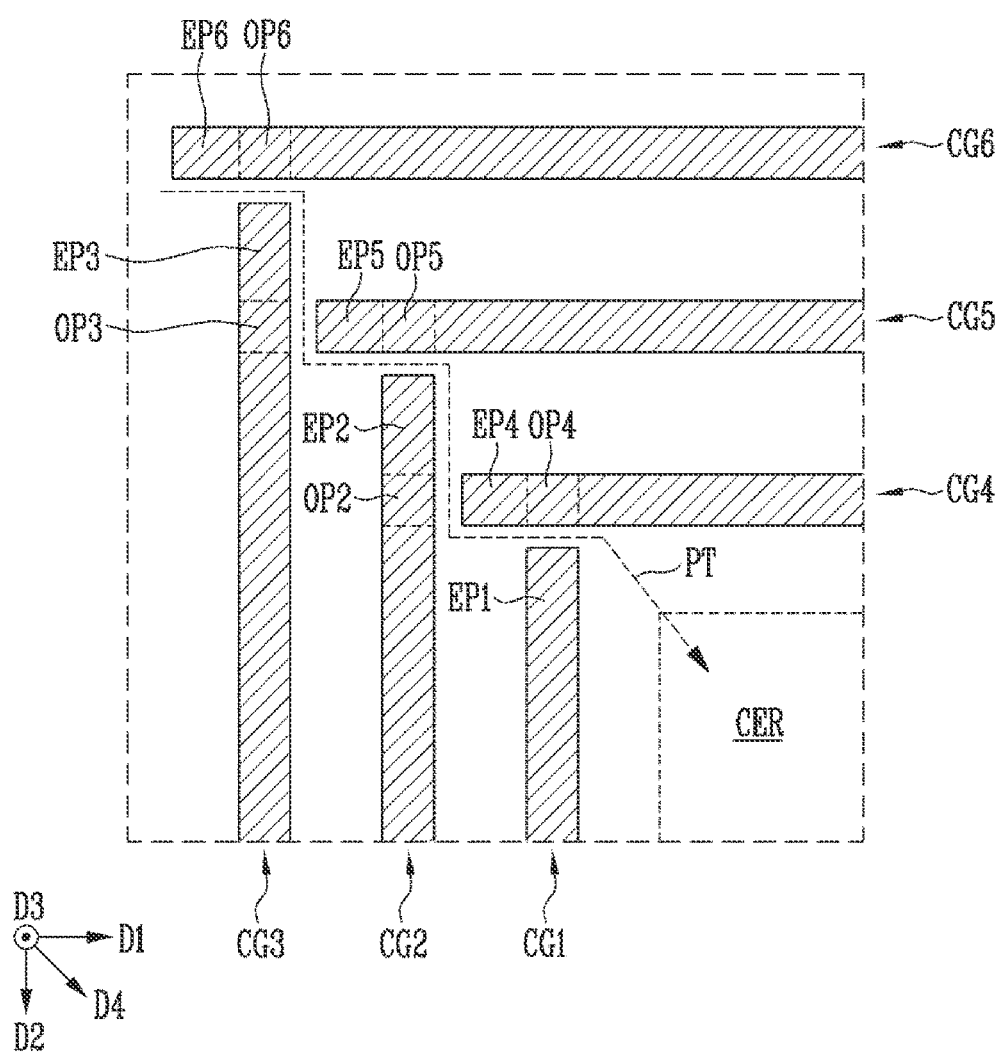
FIG. 5 is a view, illustrating an effect of the semiconductor device, shown in FIGS. 1A to 1D.

FIG. 5 is a view, illustrating an effect of the semiconductor device, shown in FIGS. 1A to 1D.

For convenience of description, overlapping descriptions of the components described with reference to FIGS. 1A to 1D will be omitted.

Referring to FIG. 5, since the first to sixth chip guards CG1, CG2, CG3, CG4, CG5, and CG6 intersect each other and overlap with each other along the first direction D1 and the second direction D2, it is difficult for foreign matters that exist outside of the semiconductor device to penetrate into the semiconductor device.

Specifically, referring to the penetration path PT of foreign matters, the foreign matters would have to sequentially pass between a sixth overlapping portion OP6 of the sixth chip guard CG6 and a third end portion EP3 of the third chip guard CG3, between a third overlapping portion OP3 of the third chip guard CG3 and a fifth end portion EP5 of the fifth chip guard CG5, between a fifth overlapping portion OP5 of the fifth chip guard CG5 and a second end portion EP2 of the second chip guard CG2, between a second overlapping portion OP2 of the second chip guard CG2 and a fourth end portion EP4 of the fourth chip guard CG4, and between a fourth overlapping portion OP4 of the fourth chip guard CG4 and a first end portion EP1 of the first chip guard CG1 to reach components (e.g., the stack structure and the cell plugs) of a cell region CER in the semiconductor device from the outside of the semiconductor device.

Accordingly, the penetration path PT of the foreign matters is lengthened, and it would be difficult for the foreign matters that exist outside of the semiconductor device to penetrate into the semiconductor device.

Figure 6:
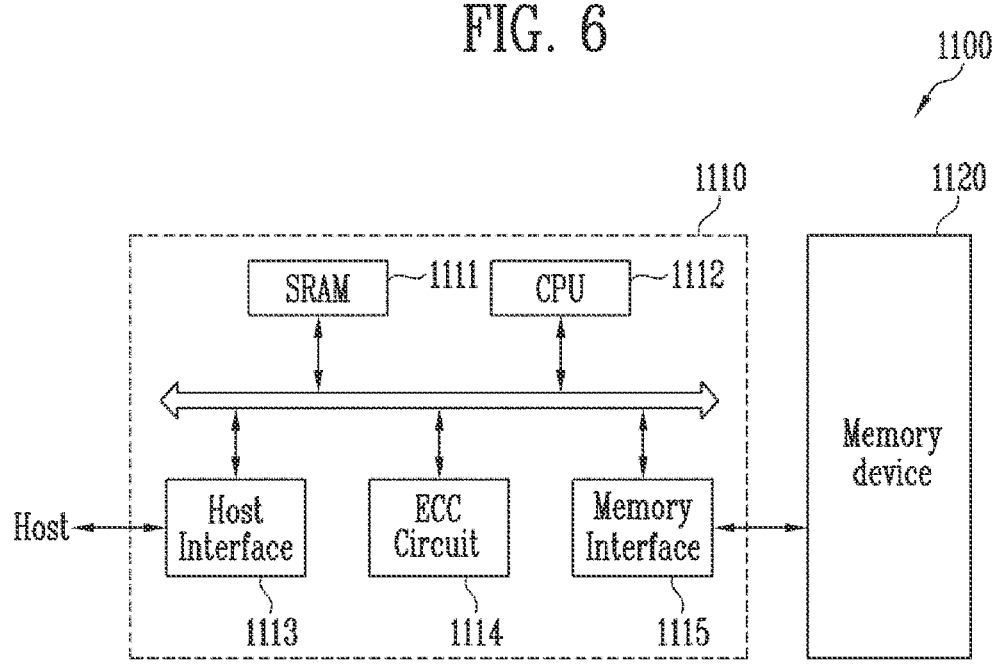
FIG. 6 is a block diagram, illustrating a configuration of a memory system in accordance with an embodiment of the present disclosure.

FIG. 6 is a block diagram, illustrating a configuration of a memory system in accordance with an embodiment of the present disclosure.

Referring to FIG. 6, the memory system 1100 in accordance with the embodiment of the present disclosure includes a memory device 1120 and a memory controller 1110.

The memory device 1120 may include the semiconductor device described over. The memory device 1120 may be a multi-chip package configured with a plurality of flash memory chips.

The memory controller 1110 is configured to control the memory device 1120, and may include a Static Random Access Memory (SRAM) 1111, a Central Processing Unit (CPU) 1112, a host interface 1113, an Error Correction Code (ECC) circuit 1114, and a memory interface 1115. The SRAM 1111 is used as an operation memory of the CPU 1112, the CPU 1112 performs overall control operations for data exchange of the memory controller 1110, and the host interface 1113 includes a data exchange protocol for a host connected with the memory system 1100. The ECC circuit 1114 detects and corrects an error included in a data read from the memory device 1120, and the memory interface 1115 interfaces with the memory device 1120. In addition, the memory controller 1110 may further include an ROM for storing code data for interfacing with the host, and the like.

The memory system 1100 may be a memory card or a Solid State Disk (SSD), in which the memory device 1120 is combined with the controller 1110. For example, when the memory system 1100 is an SSD, the memory controller 1100 may communicated with the outside (e.g., the host) through one of various interface protocols, such as a Universal Serial Bus (USB) protocol, a Multi-Media Card (MMC) protocol, a Peripheral Component Interconnection (PCI) protocol, a PCI-Express (PCI-E) protocol, an Advanced Technology Attachment (ATA) protocol, a Serial-ATA (SATA) protocol, a Parallel-ATA (PATA) protocol, a Small Computer System Interface (SCSI) protocol, an Enhanced Small Disk Interface (ESDI) protocol, and an Integrated Drive Electronics (IDE) protocol.

Figure 7:
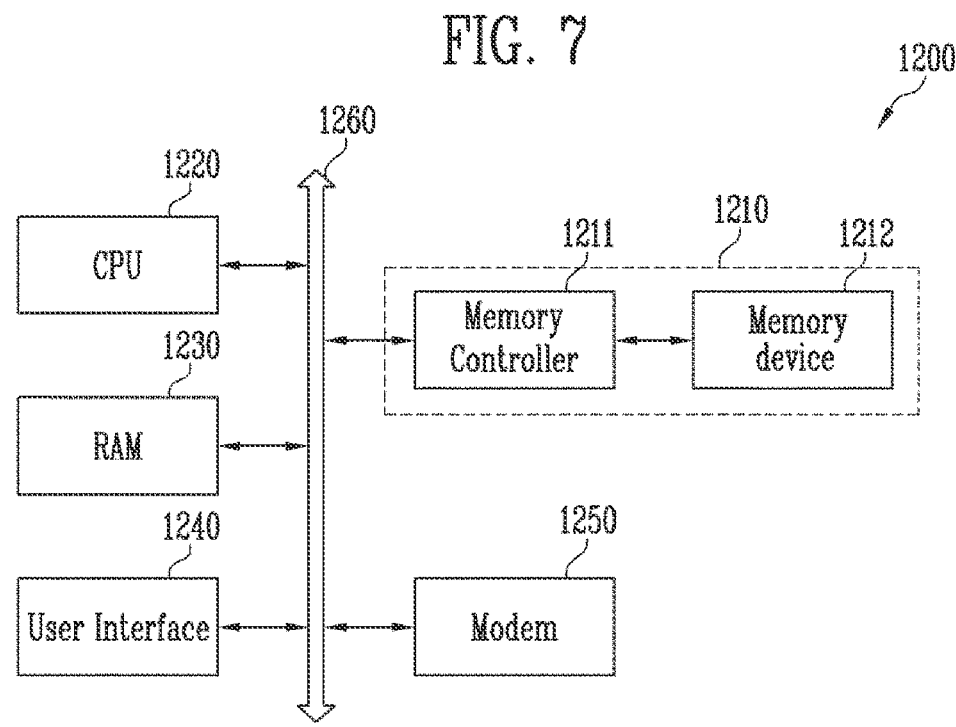
FIG. 7 is a block diagram, illustrating a configuration of a computing system in accordance with an embodiment of the present disclosure.

FIG. 7 is a block diagram, illustrating a configuration of a computing system in accordance with an embodiment of the present disclosure.

Referring to FIG. 7, the computing system 1200 in accordance with the embodiment of the present disclosure may include a CPU 1220, a random access memory (RAM) 1230, a user interface 1240, a modem 1250, and a memory system 1210, which are electrically connected to a system bus 1260. When the computing system 1200 is a mobile device, a battery for supplying an operation voltage to the computing system 1200 may be further included, and an application chip set, a Camera Image Processor, a mobile DRAM, and the like may be further included.

The memory system 1210 may be configured with a memory device 1212 and a memory controller 1211, which are similar to those described with reference to FIG. 6.

In accordance with the present disclosure, the semiconductor device includes chip guards spaced apart from each other at an edge of the chip guard region, so that crack occurrence at the edge of the chip guard region due to stress concentration may be prevented.

The exemplary embodiments of the present disclosure have been described in the drawings and specification. Although specific terminologies are used here, those are only to explain the embodiments of the present disclosure. Therefore, the present disclosure is not restricted to the over-described embodiments and many variations are possible within the spirit and scope of the present disclosure. It should be apparent to those skilled in the art that various modifications can be made on the basis of the technological scope of the present disclosure in addition to the embodiments disclosed herein.

So far as not being differently defined, all terms used herein including technical or scientific terminologies have meanings that they are commonly understood by those skilled in the art to which the present disclosure pertains. The terms having the definitions as defined in the dictionary should be understood such that they have meanings consistent with the context of the related technique. So far as not being clearly defined in this application, terms should not be understood in an ideally or excessively formal way.

What is claimed is:

1. A semiconductor device comprising:
a substrate with a cell region and a chip guard region, the chip guard region surrounding the cell region;
a plurality of chip guards over the chip guard region, the plurality of chip guards extending in a first direction, being spaced apart from each other in a second direction intersecting the first direction, and including a first chip guard and a second chip guard arranged closest to each other in the second direction;
a third chip guard extending over the chip guard region in the second direction; and
a fourth chip guard over the chip guard region, the fourth chip guard being spaced apart from the first, second and third chip guards in the first direction,
wherein the first chip guard includes a first end portion,
wherein the second chip guard includes a second end portion,
wherein the third chip guard includes a third end portion,
wherein the third end portion overlaps a space between the first chip guard and the second chip guard,
wherein a distance between the third chip guard and the second chip guard is different from a distance between the first chip guard and the second chip guard,
wherein the second end portion overlaps a space between the third chip guard and the fourth chip guard.

2. The semiconductor device of claim 1, wherein the fourth chip guard extends in the second direction to overlap the first end portion and the second end portion.

3. The semiconductor device of claim 2,
wherein the fourth chip guard includes a fourth end portion, and
wherein the second end portion is disposed between the third end portion and the fourth end portion.

4. The semiconductor device of claim 1,
wherein the third end portion is disposed farther from the cell region than the first end portion, and
wherein the second end portion is disposed farther from the cell region than the third end portion.

5. The semiconductor device of claim 1,
wherein the first chip guard includes a first long sidewall extending in the first direction and a first short sidewall extending from the first long sidewall in the second direction, and
wherein a length of the first long sidewall is longer than that of the first short sidewall.

6. The semiconductor device of claim 5,
wherein the second chip guard includes a second long sidewall extending in the first direction and a second short sidewall extending from the second long sidewall in the second direction,
wherein a length of the second long sidewall is longer than that of the second short sidewall, and
wherein the second long sidewall is disposed farther from the cell region than the first long sidewall, and
wherein the second short sidewall is disposed farther from the cell region than the first short sidewall.

7. The semiconductor device of claim 5,
wherein the third chip guard includes a third long sidewall extending in the second direction and a third short sidewall extending from the third long sidewall in the first direction, and
wherein the third long sidewall faces the first short sidewall.

8. A semiconductor device comprising:
a substrate with a cell region and a chip guard region, the chip guard region surrounding the cell region;
a first chip guard extending over the chip guard region in a first direction;
a second chip guard extending over the chip guard region in the first direction, the second chip guard being spaced apart from the first chip guard; and
a third chip guard extending over the chip guard region in a second direction, the second direction intersecting the first direction,
wherein the first chip guard includes a first long sidewall, extending in the first direction, and a first short sidewall, extending in the second direction,
wherein the second chip guard includes a second long sidewall, extending in the first direction, and a second short sidewall, extending in the second direction,
wherein the third chip guard includes a third long sidewall, extending in the second direction, and a third short sidewall, extending in the first direction,
wherein the first short sidewall faces the third long sidewall,
wherein the third short sidewall faces the second long sidewall, and
wherein the second long sidewall continuously extends longer in the first direction than the first long sidewall.

9. The semiconductor device of claim 8,
wherein the first chip guard overlaps with the third chip guard in the first direction.

10. The semiconductor device of claim 9,
wherein the third chip guard overlaps with the second chip guard in the second direction.

11. The semiconductor device of claim 8,
wherein a length of the second chip guard is longer than that of the first chip guard.

12. The semiconductor device of claim 8,
wherein the third short sidewall is disposed between the first long sidewall and the second long sidewall.

13. The semiconductor device of claim 12,
wherein the third short sidewall is disposed closer to the second long sidewall than the first long sidewall.

14. The semiconductor device of claim 8, wherein the second chip guard has a first portion overlapping the first long sidewall of the first chip guard, a second portion overlapping the third short sidewall of the third chip guard and an end portion extending from the second portion in a direction away from the first and second portions.

15. The semiconductor device of claim 1,
wherein a shortest distance between the third chip guard and the second chip guard is different from a shortest distance between the first chip guard and the second chip guard.

16. The semiconductor device of claim 1,
wherein a distance between the third chip guard and the second chip guard is shorter than a distance between the first chip guard and the second chip guard.

* * * * *